(12) United States Patent
Ballal et al.

(10) Patent No.: US 11,973,444 B2
(45) Date of Patent: Apr. 30, 2024

(54) DETERMINING ROTOR POSITION OFFSET FOR ELECTRICAL MACHINES

(71) Applicant: BorgWarner Inc., Auburn Hills, MI (US)

(72) Inventors: Siddharth Ballal, Fishers, IN (US); Arslan Qaiser, Fishers, IN (US); Brandon P. Davis, Noblesville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 175 days.

(21) Appl. No.: 17/874,610

(22) Filed: Jul. 27, 2022

(65) Prior Publication Data

US 2024/0039442 A1 Feb. 1, 2024

(51) Int. Cl.
*G01D 18/00* (2006.01)
*G01B 7/00* (2006.01)
*H02P 6/16* (2016.01)
*H02P 21/18* (2016.01)
*H02P 21/22* (2016.01)

(52) U.S. Cl.
CPC .............. *H02P 21/18* (2016.02); *G01B 7/003* (2013.01); *H02P 6/16* (2013.01); *H02P 21/22* (2016.02)

(58) Field of Classification Search
CPC . H02P 21/18; H02P 21/22; H02P 6/16; G01B 7/003
See application file for complete search history.

(56) References Cited

U.S. PATENT DOCUMENTS

| 8,897,954 B2 | 11/2014 | Anderson et al. |
| 9,438,157 B2 | 9/2016 | Adam et al. |
| 9,766,052 B2 | 9/2017 | Degner et al. |

FOREIGN PATENT DOCUMENTS

| CN | 101604887 A | * 12/2009 |
| CN | 101398316 B | * 9/2010 |

* cited by examiner

*Primary Examiner* — Cortez M Cook
(74) *Attorney, Agent, or Firm* — REISING ETHINGTON P.C.

(57) ABSTRACT

A method of calibrating an electrical machine to determine an angular offset between a motor sensor indicated position and an actual rotor position, including the steps of: supplying electrical current to stator windings; identifying a quadrant of a rotor where a rotor pole is located; approximating a line between a torque value measured at a lower angular boundary of the identified quadrant and a torque value measured at an upper angular boundary of the identified quadrant; and determining an angular offset by locating an angular position where torque exerted by the rotor is zero.

15 Claims, 4 Drawing Sheets

| Condition | Quadrant | [Θ₁, Θ₂] |
|---|---|---|
| $T_{90} < 0$ & $T_{180} < 0$ | 1 | [0, 95] |
| $T_{90} > 0$ & $T_{180} < 0$ | 2 | [90, 185] |
| $T_{90} > 0$ & $T_{180} > 0$ | 3 | [180, 275] |
| $T_{90} < 0$ & $T_{180} > 0$ | 4 | [270, 365] |

DETERMINING ROTOR POSITION OFFSET
FOR ELECTRICAL MACHINES

TECHNICAL FIELD

The present application relates to electrical machines and, more particularly, to determining a rotor position offset for rotors included in the machines.

BACKGROUND

Electrical machines (also referred to as electric motors) include stators having a plurality of windings and rotors that are angularly displaced relative to the stator in response to the application of electrical current to the windings through induction. Electrical machines may exist in a wide variety of different designs or configurations. In some applications a motor sensor may monitor the angular position of a rotor and/or motor shaft coupled with the rotor to determine a precise angular position of the rotor/motor shaft relative to the stator. However, the motor sensor may indicate a rotor/motor shaft angular position relative to the stator that is offset from an actual relative angular position of the rotor/motor shaft relative to the stator.

SUMMARY

In one implementation, a method of calibrating an electrical machine to determine an angular offset between a motor sensor indicated position and an actual rotor position includes: supplying electrical current to stator windings; identifying a quadrant of a rotor where a rotor pole is located; approximating a line between a torque value measured at a lower angular boundary of the identified quadrant and a torque value measured at an upper angular boundary of the identified quadrant; and determining an angular offset by locating an angular position where torque exerted by the rotor is zero.

In another implementation, a method of calibrating an electrical machine to determine an angular offset between a motor sensor indicated position and an actual rotor position includes: supplying electrical current to stator windings; identifying a quadrant of a rotor where a rotor pole is located; approximating a line between a torque value measured at a lower angular boundary of the identified quadrant and a torque value measured at an upper angular boundary of the identified quadrant; and performing a bi-section search to determine an angular offset by locating an angular position along the approximated line where torque exerted by the rotor is zero; determining an initial angular offset position by approximating a line between a torque value measured at a lower angular boundary of the identified quadrant and a torque value measured at an upper angular boundary of the identified quadrant; performing a bi-section search to determine a final angular offset by locating an angular position along the approximated line where torque exerted by the rotor is zero to improve the initial angular offset position; and storing the angular offset in a control system.

In yet another implementation, a system is configured to calibrate an electrical machine to determine an angular offset between a motor sensor indicated position and an actual rotor position and includes: a controller, wherein the controller includes non-volatile memory and programmed to supply electrical current to stator windings; identify a quadrant of a rotor where a rotor pole is located; approximate a line between a torque value measured at a lower angular boundary of the identified quadrant and a torque value measured at an upper angular boundary of the identified quadrant to determine an initial offset position value; and determine a final angular offset position by locating an angular position along the approximated line where torque exerted by the rotor is zero.

DETAILED DESCRIPTION

Figure 1:
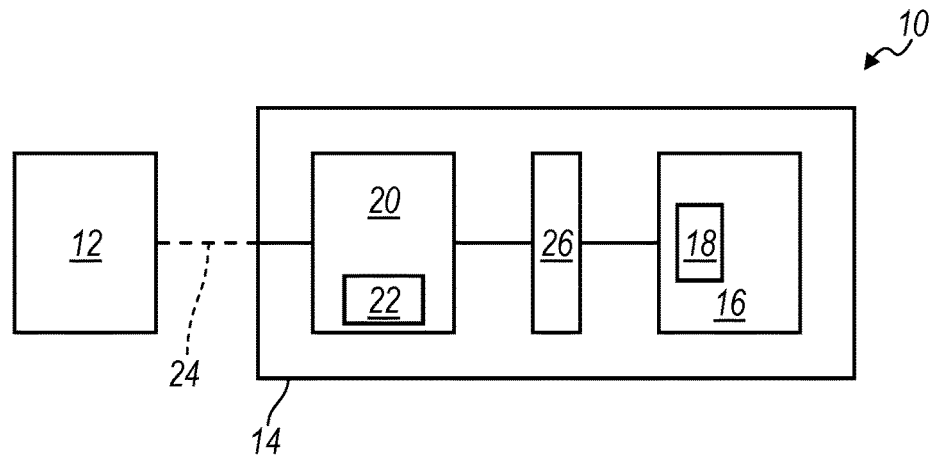
FIG. 1 is a diagram depicting an implementation of a system using an electrical machine.

An electrical machine includes a stator with a plurality of stator windings and a rotor that is angularly displaced relative to the stator in response to the application of electric current to the stator windings. A system can determine an angular offset between a motor-sensor-indicated angular position of the rotor and an actual rotor angular position. That is, a pole of the rotor can be at an angular position that is different than what a motor sensor indicates and the angular difference can be referred to as an angular offset.

The determination of the angular offset can be accomplished as part of an electrical machine calibration that applies electrical current to the stator windings at a known or fixed electrical current level thereby rotating the rotor relative to the stator at a known or fixed rate of angular velocity. A first torque value can be measured at a first angular position of a motor shaft or rotor while the stator windings are supplied the fixed electrical current level. A second torque value can be measured at a second angular position of the rotor while the stator windings are supplied the fixed electrical current level. A quadrant of an actual rotor pole angular location can be selected based on the first torque value and the second torque value. After selecting the quadrant, a line can be approximated over the measured torque values measured between quadrant angles bounding the selected quadrant. Convergence on the actual rotor pole angular location can be determined using any one of a number of techniques, such as a bisection search to locate a point along the approximated line where the measured torque of the motor shaft is zero while electrical current is supplied to the stator windings.

The calibration can identify an actual angular position of the rotor relative to a stator and contrast it with an indicated angular position of the rotor relative to the stator to determine an angular offset. The angular offset can be stored in non-volatile memory of a microcontroller or other power electronics that control the electrical machine. The microcontroller can receive a signal from a motor sensor indicating an angular position of the rotor relative to the stator, access the angular offset from memory, and add/subtract the offset to the indicated angular position of the rotor to increase the accuracy of the measurement. The calibration can be carried out without any prior knowledge of the electrical machine and can also identify the actual angular position of the rotor much quicker than previous calibration methods.

The electrical machine (also referred to as an electric motor) can be used as partial or sole source of propulsion of a vehicle and, in this implementation, the electrical machine is implemented as a permanent magnet synchronous machine. However, the calibration process described herein can be used with other implementations of electrical machines and in other systems. While the electrical machine is shown in one possible implementation as part of a system, the calibration can be carried out prior to installation in the system when the electrical machine may be removably coupled to a dynamometer that supplies a known electrical current level to the stator windings and rotates the rotor at a predefined angular velocity. The dynamometer can measure torque at the motor shaft of the electrical machine while the dynamometer supplies the stator winding the known or predefined level of electrical current. The dynamometer can carry this out using one or more microprocessors (described in more detail below) to perform the calibration method.

Turning to FIG. 1, an implementation of an electrical system 10 is shown including an electrical machine capable of being calibrated as described herein. The system 10 includes an electrical grid 12 and an electric vehicle (EV) 14 that can receive electrical power from the grid 12.

The electrical grid 12 can include any one of a number of electrical power generators and electrical delivery mechanisms. Electrical generators (not shown), such as nuclear, hydraulic-, or wind-powered plants that convert the energy of nuclear fission, flow of water through dams, or wind power of a turbine, create AC electrical power that can then be transmitted a significant distance away from the electrical generator for residential and commercial use. The electrical generator can couple with the electrical grid 12 that transmits the AC electrical power from the electrical generator to an end user, such as a residence or business. As the AC electrical power is provided to the electrical grid 12, the electrical power can exist at a relatively high voltage so that it can be communicated relatively long distances. Once the electrical power reaches a location where it is intended to be used, electrical transformers (not shown) can be used to reduce the voltage level before ultimately being provided to a residence or business. In one implementation, the voltage level of AC electrical power received by the residence or business is 240 volts (V). However, this voltage can be a different value.

The EV 14 includes one or more electrical machines 16 (also referred to as electric motors) that include a stator having stator windings and a rotor that can be angularly displaced relative to the stator (not shown). In one implementation, the electrical machine is a permanent magnet synchronous electrical machine, which includes a rotor having a plurality of angularly-spaced permanent magnets. The permanent magnets can be made from any one of a number of different materials, one example of which is a neodymium alloy or other rare earth element. As noted above, the stator windings can receive electrical current the supply of which can be controlled by a control system 18 that induces the angular displacement of the rotor relative to the stator. The control system 18 can include an array of power control electronics that facilitate the operation of the electrical machine 16. These electronics can include an inverter 18a (shown in FIG. 2) implemented using a plurality of MOSFETs that switch on and off according to a choreographed order and timing at the direction of a motor controller 18b to induce rotor angular movement. The motor controller 18b can be implemented as one or more microprocessors having input/output and non-volatile memory where data can be stored and accessed. In one implementation, the angular offset can be stored in the non-volatile data. In addition to the inverter 18a, the control system 18 can include a DC-DC converter (not shown) to regulate voltage levels of electrical power supplied to the electrical machine 16.

EV service equipment 20, also referred to as an EV charging station, can receive AC electrical power from the grid 12 and provide the electrical power to the EV 14. The EV service equipment 20 can include an input terminal that receives the AC electrical power from the grid 12 and communicates the AC electrical power to an on-board vehicle battery charger included on the EV 14. The on-board vehicle battery charger can include an AC/DC inverter so that the AC electrical power received from the grid 12 can be supplied to a vehicle battery 26. An electrical cable 24 can detachably connect with an electrical receptacle on the EV 14 and electrically link an EV charging station with the EV 14 so that AC electrical power can be communicated between the charging station and the EV 14. The EV charging station can be classified as "Level 2" EV service equipment that receives 240 VAC from the grid 12 and supplies 240 VAC to the EV 14. It is possible the level of AC electrical power input to a charging station and/or the level of AC electrical power output from a charging station is different in other implementations.

The term "electric vehicle" or "EV" can refer to vehicles that are propelled, either wholly or partially, by electrical machines or motors. EV can refer to electric vehicles, plug-in electric vehicles, hybrid-electric vehicles, and battery-powered vehicles. The vehicle battery 26 can supply DC electrical power, that has been converted from AC electrical power, to the electrical machine(s) 16 that propel the EV. As noted above, the control system 18 can convert the DC electrical power into AC electrical power to induce angular movement of the rotor relative to the stator. The vehicle battery 26 or batteries are rechargeable and can include lead-acid batteries, nickel cadmium (NiCd), nickel metal hydride, lithium-ion, and lithium polymer batteries, to name a few. A typical range of vehicle battery voltages can range from 200 to 800V of DC electrical power (VDC).

Figure 2:
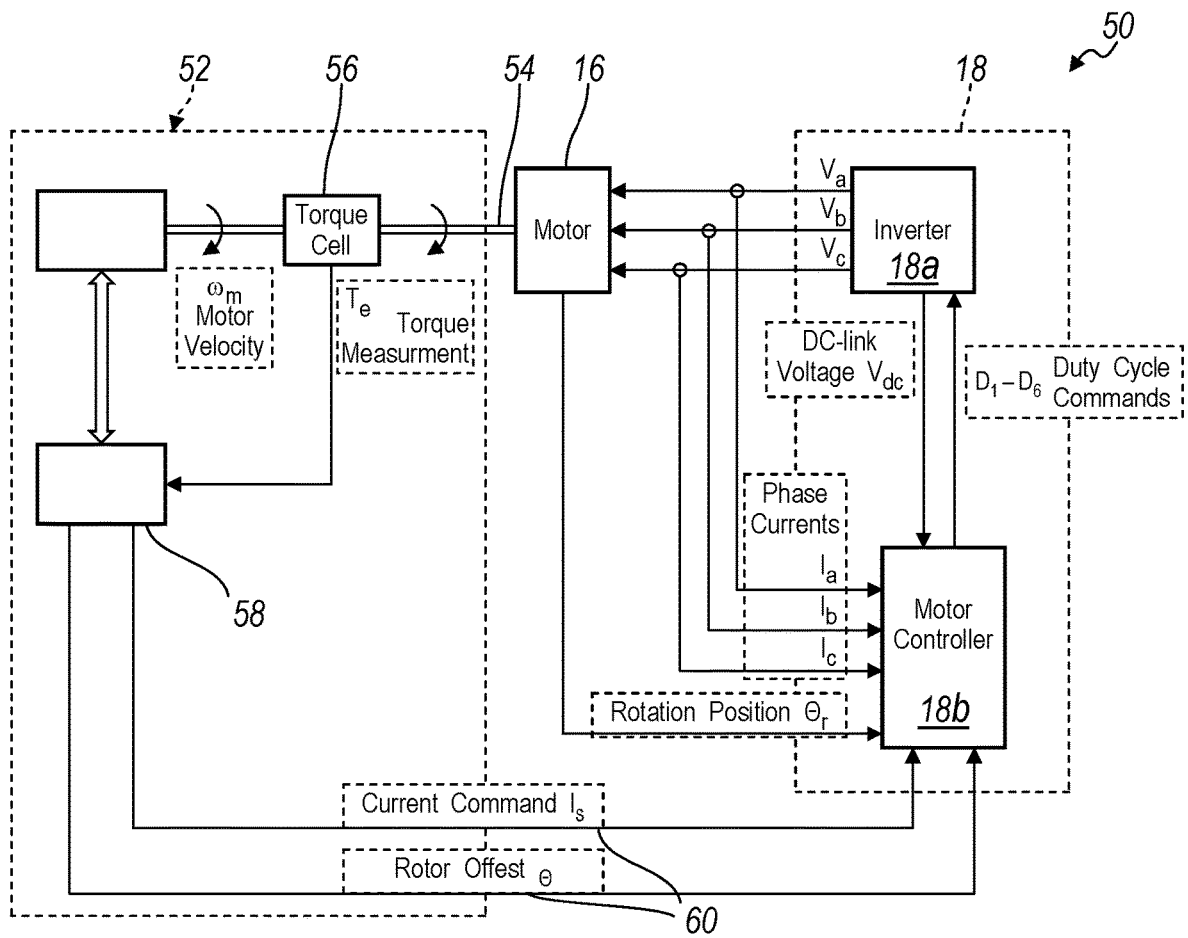
FIG. 2 is a diagram depicting an implementation of a calibration system capable of calibrating an electrical machine.

FIG. 2 depicts an implementation of a calibration system 50 capable of carrying out the calibration process. The calibration system 50 can include a dynamometer 52 capable of receiving the electrical machine 16 for purposes of calibrating the machine 16 to find the angular offset of the rotor. The dynamometer 52 can include a torque cell 56 that releasably couples to a motor shaft 54 of the electrical machine 16 to measure an amount and direction of torque exerted by the motor shaft 54. The dynamometer 52 can also include a dynamometer controller 58 that receives data and generates control signals. The dynamometer controller 58 can be implemented using one or more microprocessors having input/output and non-volatile memory where data can be stored and accessed. The dynamometer controller 58 can receive a data signal generated by the torque cell 56 indicating the amount of torque exerted by the motor shaft 54. The dynamometer controller 58 can also generate an electrical current command that can be transmitted over a data link 60 directing the electrical machine to flow a defined amount of current through the stator wires. In addition, the dynamometer controller 58 can calculate an angular offset using the calibration process described herein, transmit the angular offset over the data link, and the control system 18 can store the angular offset in non-volatile memory. Dynamometers capable of carrying out the calibration process should be capable of four quadrant operation and be able to operate in positive and negative angular velocity as well as to provide power to and recuperate power from the electrical machine under test.

Figure 3:
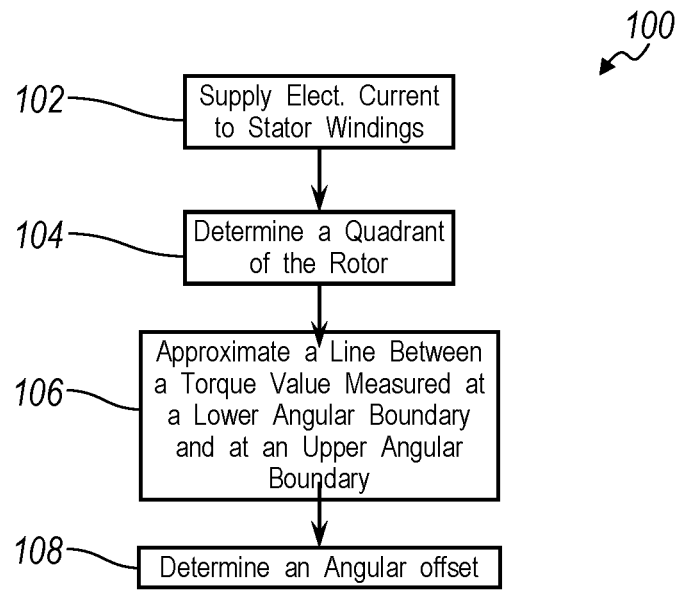
FIG. 3 is a flow chart depicting an implementation of a method of calibrating an electric machine.
Figure 4:
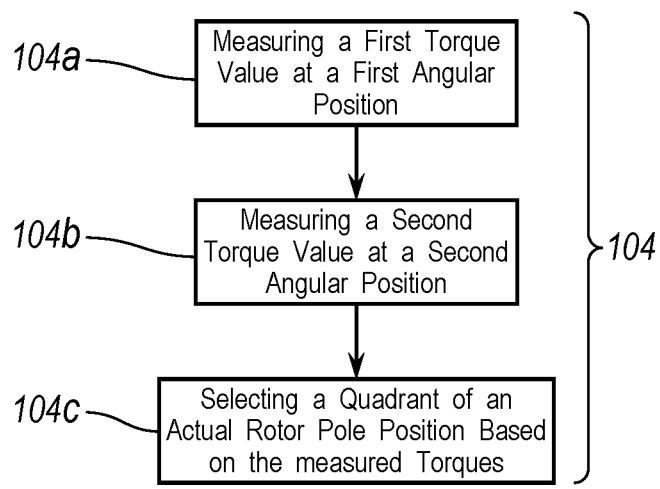
FIG. 4 is a flow chart depicting a portion of an implementation of a method of calibrating an electric machine.
Figures 5, 6:
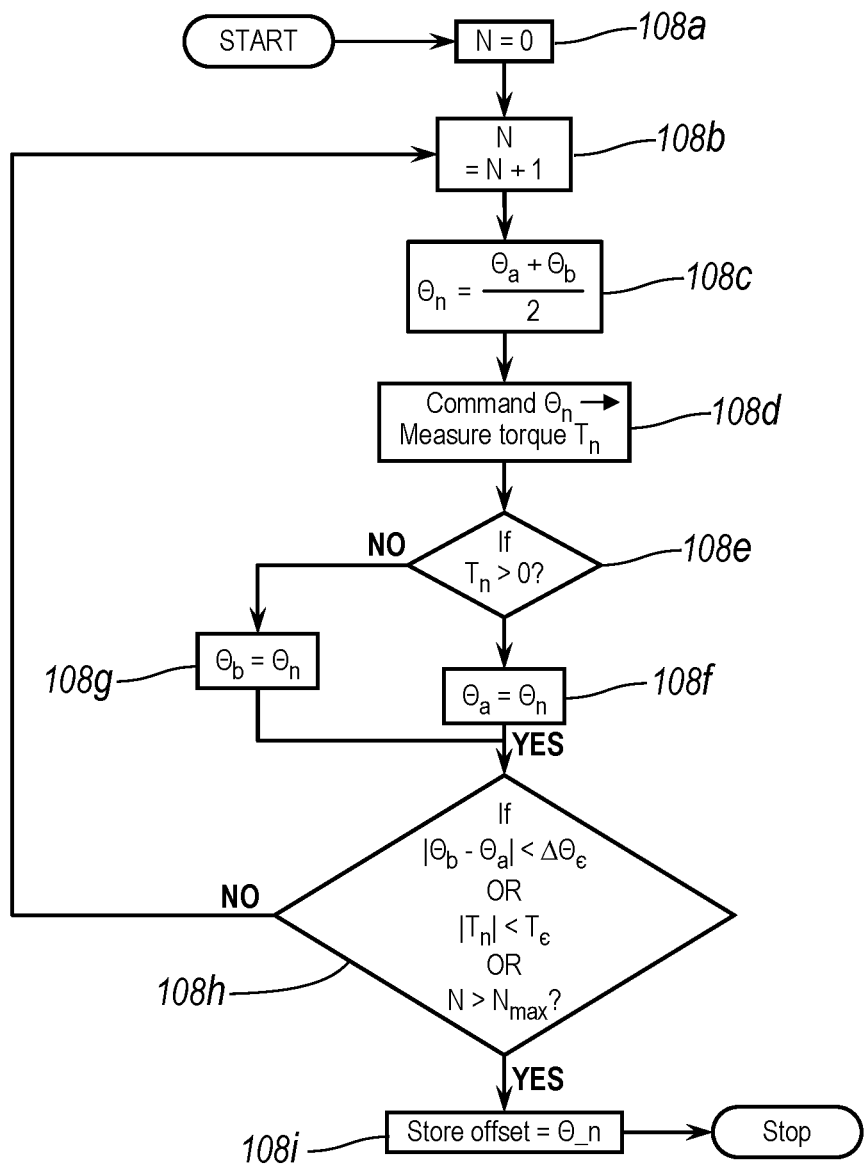
FIG. 5 is a flow chart depicting a portion of an implementation of a method of calibrating an electric machine.
FIG. 6 is a table depicting a portion of an implementation of a method of calibrating an electric machine.

Turning to FIGS. 3-5, a process 100 of calibrating the electrical machine 16 to determine an angular offset between a motor sensor indicated angular position of the rotor and an actual angular position of the rotor is shown. The process 100 can identify an actual angular position of the rotor relative to a stator and contrast it with an indicated angular position of the rotor relative to the stator and determine the angular offset. The angular offset can be stored in non-volatile memory of the control system 18. The control system 18 can receive a signal from a motor sensor indicating an angular position of the rotor relative to the stator, access the angular offset from memory, and add/subtract the angular offset to the indicated angular position to increase the accuracy of the microprocessor. The process 100 begins at step 102 with supplying electrical current to the stator windings at a known or fixed electrical current level thereby rotating the rotor relative to the stator at a known or fixed rate of angular velocity. In one implementation, the dynamometer can supply stator windings with 150 amps. The dynamometer controller 58 can rotate the rotor at a known angular velocity. In one implementation, 1000 revolutions per minute (RPM). The dynamometer controller 58 can then send a known or fixed current stator command and a known or fixed rotor offset angle to the calibration system 50. The control system 50 can regulate the stator current level in the electric motor 16 to the commanded value. The method 100 proceeds to step 104.

At step 104, a quadrant of the rotor can be determined. Determining the quadrant of the rotor can begin at sub step 104a by measuring a first torque value at a first angular offset value while the stator windings are supplied the fixed electrical current level. In one implementation, the dynamometer 52 can apply 150 amps of electrical current to induce the rotor, and thereby the motor shaft, to rotate at 1,000 revolutions-per-minute (RPM). This step 104a can be carried out by the dynamometer 52 having a controller 58 that commands the calibration system 50 via the data link 60 to control the supply of stator current to a known or fixed value and a known or fixed first angular offset position. A first torque value can be measured using the torque cell 56. As this is carried out, the dynamometer 52 can monitor a signal output received from the motor sensor that indicates an angular position of the rotor relative to the stator. After measuring the first torque value at the first angular offset position, the dynamometer can measure a second torque value at a second angular offset position while the stator windings are supplied the fixed electrical current level at sub step 104b. One implementation of those measurements is shown in a graph as FIG. 7. The graph indicates torque values measured at the motor shaft of the electrical machine 16 as the rotor angular offset position is angularly displaced relative to the stator while commanding a known or fixed stator winding current.

A quadrant of an actual rotor pole location of the rotor can be selected based on the measured first torque value at the first angular offset position and the second torque value at the second angular offset position at step 104c. In this implementation, the first angular offset position can be at 90 degrees and the second angular offset position can be at 180 degrees. The dynamometer 52 can select one of four quadrants based on a comparison of the measured first torque value and the measured second torque value at the first and second angular offset positions, respectively, with the content of a lookup table that can be accessed by one or more microprocessors of the dynamometer. The lookup table can be stored at the dynamometer controller 58 in non-volatile memory or can be accessed from an external memory device. An explanation of that lookup table is shown in FIG. 6.

For example, the measured first torque value and the measured second torque value at the first and second angular offset positions can be determined to be negative or positive. If the measured torque value at the first angular offset position is negative and the measured torque value at the second angular offset position is negative, the dynamometer 52 can select the first quadrant. The first quadrant can have a lower angular boundary of 0 degrees and an upper angular boundary of 95 degrees as defined on a traditional unit circle moving counterclockwise and having an angular range of 211 or 360 degrees. If the measured torque value at the first angular offset position is negative and the measured torque value at the second angular offset position is positive, the dynamometer 52 can select the second quadrant. The second quadrant can have a lower angular boundary of 90 degrees and an upper angular boundary of 185 degrees. If the measured torque value at the first angular offset is positive and the measured torque value at the second angular offset position is negative, the dynamometer 52 can select the third quadrant. The third quadrant can have a lower angular boundary of 180 degrees and an upper angular boundary of 275 degrees. If the measured torque value at the first angular position is negative and the measured torque value at the second angular position does not meet the criteria for selecting the first, second, or third quadrants, the dynamometer 52 can select the fourth quadrant. The fourth quadrant can have a lower angular boundary of 270 degrees and an upper angular boundary of 365 degrees (or 5 degrees).

Figure 7:
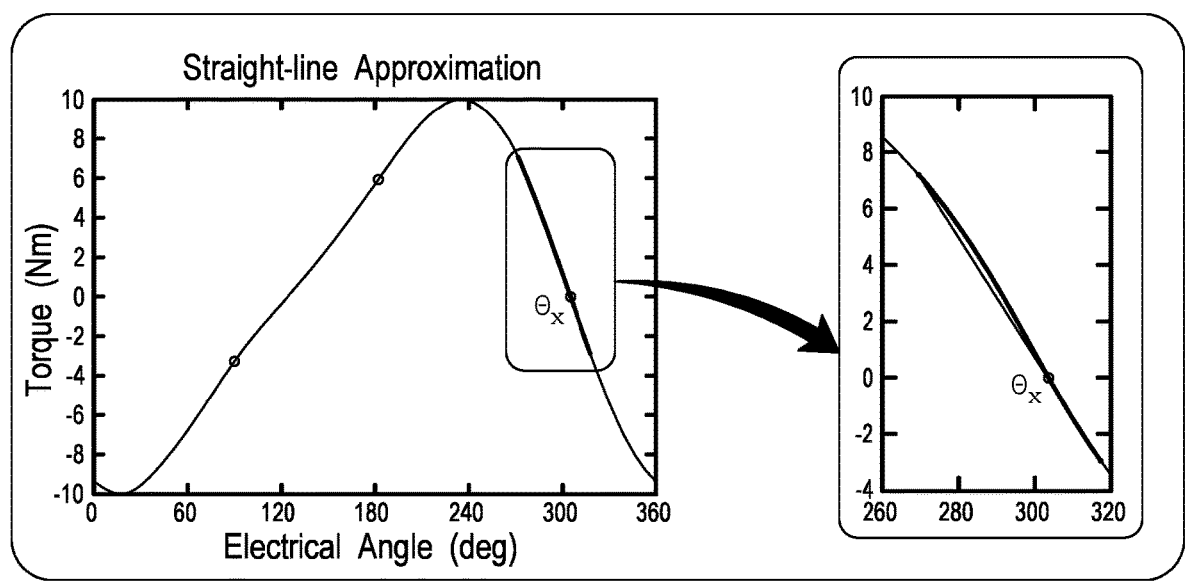
FIG. 7 is a flow chart depicting a portion of an implementation of a method of calibrating an electric machine.

An example is shown in FIG. 7 indicating the measured torque values of the electrical machine 16 as they are measured over a range of angular rotor positions extending from 0-360 degrees as the rotor or motor shaft position is indicated by the motor sensor. In this example, the measured torque at 90 degrees and 180 degrees does not meet the criteria in the lookup table needed to select one of the first, second, or third quadrants, so the dynamometer 52 may select quadrant four in this implementation. The lower angular boundary can be set as 270 degrees and the upper angular boundary can be set as 365 degrees. The dynamometer 52 can set a torque measurement associated with the lower angular boundary and a torque measurement associated with the upper angular boundary. The method 100 proceeds to step 106.

At step 106, a line can be approximated between the torque value measured at the lower angular boundary of the quadrant and the torque value measured at the upper angular boundary of the quadrant. With reference to the example shown in FIG. 7, the lower angular boundary can be 270 degrees and the torque measurement may be 7 Newton/meters (N/m) while the upper angular boundary can be 365 degrees and the torque measurement may be −3 N/m. The dynamometer 52 can fit a line between these two torque measurements using line approximation as shown. Given the torque measurement at the lower angular boundary and the torque measurement at an upper angular boundary, a midpoint torque can be determined by adding the lower angular boundary to the upper angular boundary and dividing by two to determine an angular midpoint. The measured torque at the midpoint can be used to approximate the line. For example, $\theta=\theta_1$ degrees, measure lower angular boundary torque $T_1$
$\theta=\theta_2$ degrees, measure upper angular boundary torque $T_2$
$\theta=(\theta_1+\theta_2)/2$ degrees, measure midpoint torque $T_m$ If the lower angular boundary torque $T_1$ multiplied by the midpoint torque $T_m$ is greater than zero, then $\theta_1$ becomes $\theta_m$ and $T_1$ becomes $T_m$. And if the lower angular boundary torque $T_1$ multiplied by the midpoint torque $T_m$ is not greater than zero, then $\theta_2$ becomes $\theta_m$ and $T_2$ becomes $T_m$. The fitted line can extend from an angular range between $\theta_a$ to $\theta_b$ that can be determined using:

$$\theta x=(\theta_2-\theta1)/(T_2-T_1)\times -T_1+\theta_1$$

$$\theta a=\max(\theta x-\theta\epsilon,\theta_1)$$

$$\theta b=\min(\theta x+\theta\epsilon,\theta_2)$$

+/−θϵ can be an additional margin added to θa and θb when a rotor pole is very close to $\theta_1$ or $\theta_2$. In one implementation, the value θϵ can be set to +/−5 degrees. The method 100 proceeds to step 108.

At step 108, the location of a pole of the rotor and thereby determine an amount of rotor offset indicating the difference between the position of the rotor relative to the stator indicated by a motor sensor, and an actual rotor position relative to the stator is determined. The dynamometer 52 can determine when the torque measured on the motor shaft equals zero. This can be determined in any one of a variety of ways. In one implementation, the dynamometer 52 can use a bi-section search to locate zero torque on the approximated line. This is shown as a subroutine beginning at step 108a in FIG. 5. At step 108a, the number of iterations can be set to zero and the following assumed:

N=number or iterations
Nmax=maximum number of iterations. For example, Nmax=20 iterations
Δθϵ=the rotor angle tolerance. For example, Δθϵ=0.01 e·deg
Tϵ=the torque tolerance. For example, Tϵ=0.05 Nm.

In one implementation, Nmax=20 iterations, Δθϵ=0.01 e·deg, Tϵ=0.05 Nm. The method 100 proceeds to step 108b where the number of iterations is incremented by one. Then, at step 108c, (θa+θb)/2, is determined. At step 108d, the dynamometer 52 can measure torque $T_n$ at the motor shaft. The dynamometer 52 can then determine whether $T_n$ is greater than zero at step 108e. If yes, θa can be set to θn at step 108f. Otherwise, θb will be set to θn at step 108g. The method 100 proceeds to step 108h.

At step 108h, a comparison can be made. If the absolute value of θb−θa<Δθϵ or the absolute value of $T_n$<Tϵ or N>Nmax, then the dynamometer 52 can store θn as the offset angular value between actual relative position of the rotor relative to the stator and the indicated relative position of the rotor relative to the stator at step 108i. The dynamometer 52 can store the offset angular value in non-volatile memory at the control system 18 and the value can be accessed later and used to compensate for the error. The method 100 would then end. Otherwise, the method 100 returns to step 108b.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of calibrating an electrical machine to determine an angular offset between a motor sensor indicated position and an actual rotor position, comprising the steps of:
   (a) supplying electrical current to stator windings;
   (b) identifying a quadrant of a rotor where a rotor pole is located;
   (c) approximating a line between a torque value measured at a lower angular boundary of the identified quadrant and a torque value measured at an upper angular boundary of the identified quadrant; and
   (d) determining an angular offset by locating an angular position where torque exerted by the rotor is zero.

2. The method of calibrating an electrical machine recited in claim 1, wherein the electrical current supplied to the rotor windings is a constant amount.

3. The method of calibrating an electrical machine recited in claim 1, wherein steps (a)-(d) are carried out by a dynamometer.

4. The method of calibrating an electrical machine recited in claim 1, wherein step (b) further comprises measuring a first torque value at a first angular offset position and measuring a second torque value at a second angular position.

5. The method of calibrating an electrical machine recited in claim 4, wherein the first angular position is located at 90 degrees and the second angular position is located at 180 degrees.

6. The method of calibrating an electrical machine recited in claim 1, further comprising the step of storing the angular offset in a control system.

7. A method of calibrating an electrical machine to determine an angular offset between a motor sensor indicated position and an actual rotor position, comprising the steps of:
   (a) supplying electrical current to stator windings;
   (b) identifying a quadrant of a rotor where a rotor pole is located;
   (c) determining an initial angular offset position by approximating a line between a torque value measured at a lower angular boundary of the identified quadrant and a torque value measured at an upper angular boundary of the identified quadrant; and
   (d) performing a bi-section search to determine a final angular offset by locating an angular position along the approximated line where torque exerted by the rotor is zero to improve the initial angular offset position;
   (e) storing the angular offset in a control system.

8. The method of calibrating an electrical machine recited in claim 7, wherein the electrical current supplied to the rotor windings is a constant amount.

9. The method of calibrating an electrical machine recited in claim 7, wherein steps (a)-(d) are carried out by a dynamometer.

10. The method of calibrating an electrical machine recited in claim 7, wherein step (b) further comprises measuring a first torque value at a first angular position and measuring a second torque value at a second angular position.

11. The method of calibrating an electrical machine recited in claim 10, wherein the first angular position is located at 90 degrees and the second angular position is located at 180 degrees.

12. A system configured to calibrate an electrical machine to determine an angular offset between a motor sensor indicated position and an actual rotor position, comprising: a controller, wherein the controller includes non-volatile memory and programmed to supply electrical current to stator windings; identify a quadrant of a rotor where a rotor pole is located; approximate a line between a torque value measured at a lower angular boundary of the identified quadrant and a torque value measured at an upper angular boundary of the identified quadrant to determine an initial offset position value; and determine a final angular offset position by locating an angular position along the approximated line where torque exerted by the rotor is zero.

13. The system recited in claim 12, wherein the system includes a dynamometer.

14. The system recited in claim 12, wherein the controller is a dynamometer controller.

15. The system recited in claim 12, further comprising a control system for controlling the electrical machine.

\* \* \* \* \*